US012801074B2

(12) United States Patent
Okada

(10) Patent No.: US 12,801,074 B2
(45) Date of Patent: Nov. 17, 2026

(54) PRINTING SYSTEM INCLUDING STATIC ELIMINATION APPARATUS, CONTROL METHOD THEREOF, AND STORAGE MEDIUM

(71) Applicant: CANON KABUSHIKI KAISHA, Tokyo (JP)

(72) Inventor: Hideyuki Okada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/406,229

(22) Filed: Dec. 2, 2025

(65) Prior Publication Data

US 2026/0153829 A1 Jun. 4, 2026

(30) Foreign Application Priority Data

Dec. 3, 2024 (JP) ................................ 2024-209877

(51) Int. Cl.
*G03G 15/00* (2006.01)

(52) U.S. Cl.
CPC ................................ *G03G 15/6573* (2013.01)

(58) Field of Classification Search
CPC ........... G03G 15/6573; G03G 15/6582; B65H 2301/5133
See application file for complete search history.

(56) References Cited

U.S. PATENT DOCUMENTS

| | | | | |
|---|---|---|---|---|
| 2008/0290591 A1* | 11/2008 | Shimizu | ................. | B65H 43/00 271/208 |
| 2016/0187846 A1* | 6/2016 | Kurosu | .............. | G03G 15/6573 399/341 |
| 2024/0255884 A1* | 8/2024 | Aihara | ................. | B65H 29/125 |
| 2024/0256812 A1* | 8/2024 | Okada | .................. | G06K 15/005 |
| 2024/0319649 A1* | 9/2024 | Okada | ................ | G03G 15/5029 |
| 2024/0369955 A1* | 11/2024 | Michishita | ......... | G03G 15/5016 |

FOREIGN PATENT DOCUMENTS

| | | |
|---|---|---|
| JP | H11258881 A | 9/1999 |

* cited by examiner

*Primary Examiner* — Carla J Therrien
(74) *Attorney, Agent, or Firm* — Canon U.S.A., Inc. IP Division

(57) ABSTRACT

There is a control method of a printing system that comprises a printing apparatus configured to store sheet data, wherein the sheet data include a respective first setting value for each sheet type, and a static elimination apparatus configured to perform a static elimination process for a sheet received from the printing apparatus, wherein the sheet received from the printing apparatus has been subjected to printing by the printing apparatus, wherein the control method comprises controlling, in the static elimination apparatus, the static elimination process by using a voltage value of a static elimination bias determined based on the respective first setting value for the sheet type of the sheet received from the printing apparatus and a second setting value set by the static elimination apparatus.

10 Claims, 10 Drawing Sheets

PRINTING SYSTEM INCLUDING STATIC ELIMINATION APPARATUS, CONTROL METHOD THEREOF, AND STORAGE MEDIUM

BACKGROUND

Field of the Technology

The present disclosure relates to a printing system that includes a static elimination apparatus performing static elimination for a charged recording medium, a control method of the printing system, and a storage medium.

Description of the Related Art

A recording medium (hereinafter, typically referred to as a "sheet") used in a printing operation is conveyed in a static electricity state due to remaining electric charge in an electrophotographic process or to slight friction with a conveyance roller or a guide generated during sheet conveyance. Due to the static electricity, the sheets may stick to each other. In addition, dust or paper dust adheres to a product to cause quality deterioration of the product.

Here, in a case of plain paper or the like, electric resistance of the sheet itself is low, and an electric charge is easily moved in the paper, so that an amount of charge is also small. However, in a case of a sheet using synthetic resin (plastic), such as thick paper, synthetic paper, or coated paper, electric resistance of the sheet itself is high, and electric charge movement in the paper is difficult.

Therefore, as a result, the sheet such as the synthetic paper or the coated paper tends to be more easily charged with electricity, and the electric charges tend to remain. In addition, it is generally known that the suchlike sheet is susceptible to influence of the environment, in particular, humidity, and that as the humidity is lower, an amount of discharge to the air is reduced, so that the static electricity is easily generated.

If a post-process is performed in a state where the sheets stick to each other, then not only a quality of the post-process deteriorates due to an influence on a sheet alignment process, but also a jam due to a sheet feeding failure or a conveyance failure at the time of the post-process may be induced to damage the sheets or devices.

Therefore, in order not to generate such a risk, it is desirable to eliminate the static electricity from the sheet after a printing process before performing the post-process. Therefore, a proposal has been made to cancel out the electric charge taken on the sheet by applying a voltage to a pair of conveying rollers located downstream in the sheet conveying direction (Japanese Patent Laid-Open No. H11-258881).

In a static elimination process using a configuration in which a voltage is applied to a conveyance roller (hereinafter referred to as a "static elimination roller"), the charged static electricity is canceled out by applying an electric charge opposite to the electric charge taken on the sheet to the sheet via the static elimination roller.

Therefore, it is necessary to perform static elimination control by the static elimination roller (the opposite electric charge to the sheet is applied) in accordance with an electric charge amount of the sheet. That is, there is an optimum applied voltage value for the static elimination for each printing environment, such as temperature and humidity, or for each type of the sheet.

When the static elimination control is performed on the sheet in a state of inappropriate adjustment of the applied voltage value, there is a possibility that the charge becomes strong on the contrary, leading to further sticking of the sheets.

Therefore, it is necessary to perform the static elimination control using the optimum applied voltage value according to the use environment and the type of the sheet to be used.

Therefore, in order to adjust the applied voltage value to be applied to the static elimination roller to a value optimum for the sheet to be used, a configuration has been proposed in which a dial-type knob is provided in a printing apparatus or a dedicated post-processing apparatus having the static elimination roller, and the applied voltage value is adjusted.

The adjustment of the applied voltage by such a hard switch is advantageous in that the operation is simple and the adjustment can be performed intuitively.

However, on the other hand, only one applied voltage value can be set for the device, so that it is necessary to reset the value anew to an optimum value every time the sheet used for printing is switched. In addition, it is impossible for suchlike adjustment to cope with printing of a product in which different sheet types having different optimum applied voltage values are mixed.

Therefore, there has been also proposed a method in which an optimum applied voltage value for each sheet type is stored as one sheet data of the sheet, and at the time of printing, the optimum applied voltage value is read out in accordance with the sheet to be used, and the static elimination control is performed while switching the applied voltage value.

According to this method, it is possible to save the trouble of re-adjusting the applied voltage value every time the sheet to be used for making the product is switched.

In addition, by reading the applied voltage value held in the sheet data of the sheet to be used every time and performing printing while switching the setting, it is possible to print the product in which the different sheet types having the different optimum applied voltage values are mixed.

However, there is a case in which an unexpectedly large amount of charge is generated in the product even though the adjusted applied voltage value held in the sheet data of the sheet used for printing is called to perform the static elimination control.

One factor of such a trouble is that environmental conditions such as temperature and humidity are different between when the optimum applied voltage value is adjusted and when printing is performed, and thus the optimum applied voltage value itself has been changed. In addition, there is a case where the printing apparatus is affected by a temperature rise inside the printing apparatus accompanying printing or weather, and thus the printing apparatus falls into a similar case.

In the case like this, it is usual that fine adjustment is made to the adjusted applied voltage value and the resultant value is used for printing.

However, in the case of updating the value held in the sheet data, it is necessary to perform an operation of searching for and selecting the sheet from a list of the sheet types supported by the printing apparatus, and editing the sheet data via a sheet data change screen.

In addition, the update of the setting value due to a transient factor, such as a temperature change in the printing apparatus during printing or weather, often restores the setting value to the original value on a later day, which generally lacks convenience.

SUMMARY

The present disclosure is made in view of such problems as described above, and some embodiments are directed to a printing system that comprises a printing apparatus configured to store sheet data, wherein the sheet data include a respective first setting value for each sheet type, and a static elimination apparatus configured to perform a static elimination process for a sheet received from the printing apparatus, wherein the sheet received from the printing apparatus has been subjected to printing by the printing apparatus, wherein the static elimination apparatus comprises a control unit configured to control the static elimination process by using a voltage value of a static elimination bias determined based on the respective first setting value for the sheet type of the sheet received from the printing apparatus and a second setting value set by the static elimination apparatus.

Features of various embodiments of the present disclosure will become apparent from the following description of embodiments with reference to the attached drawings. The following description of embodiments is described by way of example.

DESCRIPTION OF THE EMBODIMENTS

Hereinafter, embodiments of the present technology will be described with reference to the drawings.

Note that the following embodiments do not limit the disclosure in the claims, and all combinations of the features described in the embodiments are not necessarily essential to means for solving problems of the disclosure.

Overall Configuration of System

Figure 1:
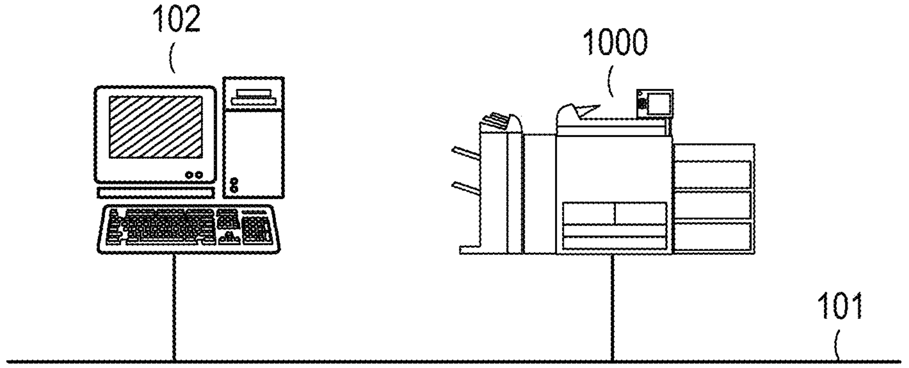
FIG. 1 is an overall configuration diagram of a system according to an embodiment.

FIG. 1 illustrates a simple configuration of the present embodiment, in which a printing system 1000 and a client computer 102 (hereinafter, referred to as a "PC 102") are mutually connected via a network 101. The PC 102 can transmit PDL (page description language) code data, which is a print job, to the printing system 1000 via the network 101.

Printing System

Next, the printing system 1000 will be described with reference to a system block diagram of FIG. 2.

The printing system 1000 includes a printing apparatus 100, which is a portion surrounded by a dotted line in the diagram, and a sheet processing apparatus 200. An arbitrary number of the sheet processing apparatuses 200 can be connected to the printing apparatus 100.

Besides, in the present embodiment, an MFP (multifunction peripheral) having a plurality of functions such as a copy function, a printer function, and the like will be described as an example of the printing apparatus 100. However, the printing apparatus 100 may be a single-function printing apparatus having only a copy function or only a printer function.

In the present embodiment, as an example, the printing system 1000 includes various constituent elements described below.

The printing system 1000 is configured to allow the sheet processing apparatus 200 connected to the printing apparatus 100 to perform a sheet process on a sheet printed by the printing apparatus 100. However, it is also possible to configure the printing system 1000 with only the printing apparatus 100 without connecting the sheet processing apparatus 200.

The sheet processing apparatus 200 is configured to be communicable with the printing apparatus 100, and the sheet processing apparatus 200 can execute the sheet process as described below in response to an instruction from the printing apparatus 100.

[Printing Apparatus]

Next, the hardware configuration of the printing apparatus 100 will be described in detail.

A scanner unit 201 reads an image on a document, converts the image into image data, and transfers the image data to another unit.

An external I/F 202 transmits and receives data to and from other apparatuses connected to the network 101.

A printer unit 203 prints an image based on the input image data on a sheet.

Figure 4:
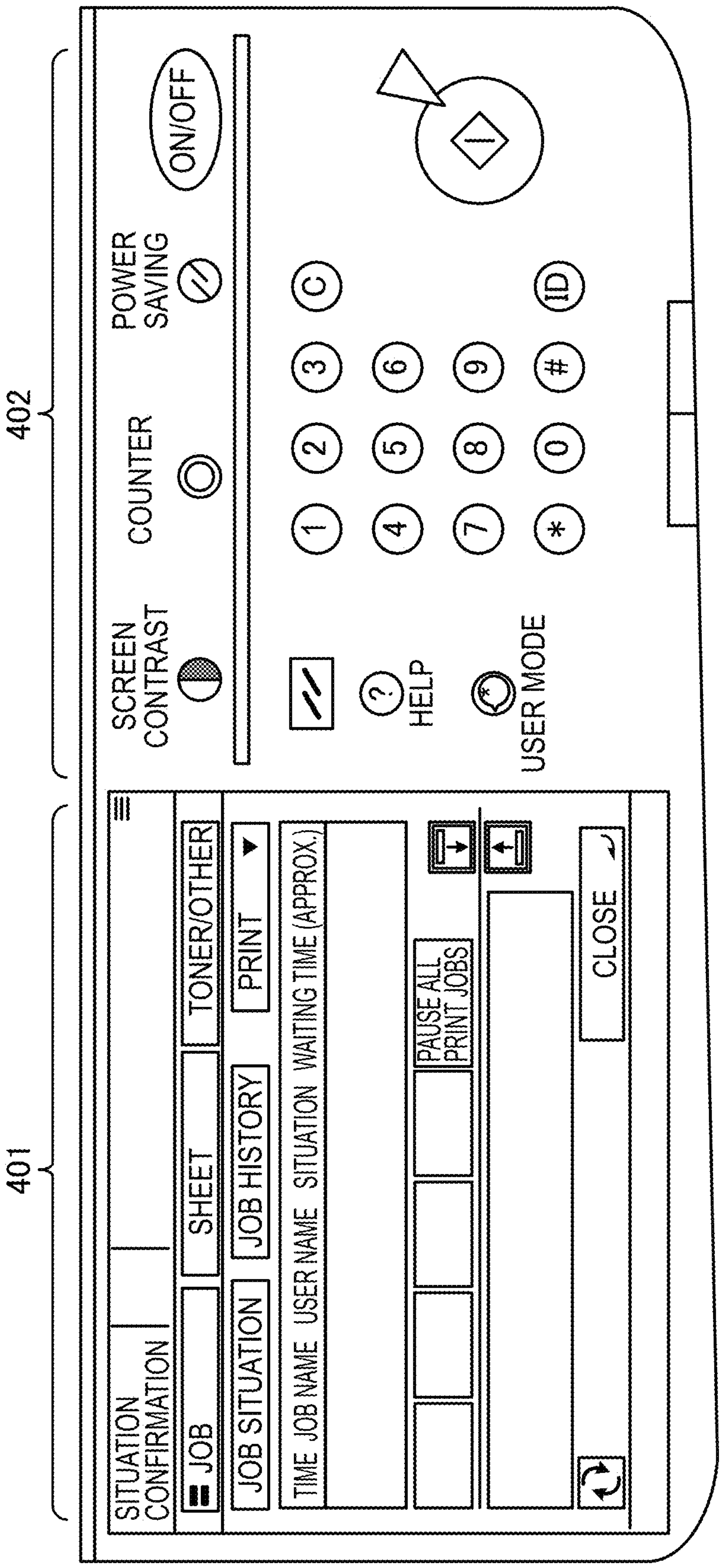
FIG. 4 is a diagram of an operation unit included in a printing apparatus.

An operation unit 204 has a configuration as illustrated in FIG. 4, has a hard key input unit (key input unit) 402 and a touch panel unit 401, and accepts an instruction from a user via them. The operation unit 204 performs various displays on the touch panel unit 401 included in the operation unit 204.

A control unit 205 comprehensively controls processes, operations, and the like of various units included in the printing system 1000. That is, the control unit 205 also controls operations of the printing apparatus 100 and the sheet processing apparatus 200 connected to the printing apparatus 100.

A ROM 207 stores various computer programs to be executed by the control unit 205.

For example, the ROM 207 stores a program for causing the control unit 205 to execute various processes of flowcharts described later, and the ROM 207 stores a display control program necessary for displaying various setting screens described later.

Besides, the ROM 207 stores a program for causing the control unit 205 to interpret PDL code data received from the PC 102 and expand the PDL code data into raster image data. In addition, the ROM 207 stores a boot sequence, font information, and the like.

A RAM 208 stores image data and PDL code data sent from the scanner unit 201 and the external I/F 202, various programs loaded from the ROM 207, and setting information. Besides, the RAM 208 stores information (information relating to the type and function of each sheet processing apparatus 200 connected to the printing apparatus 100) regarding the sheet processing apparatus 200.

The control unit 205 can use the information on the sheet processing apparatus 200 stored in the RAM 208, for the control.

An HDD (hard disk drive) 209 includes a hard disk, a drive unit that reads and writes data from and to the hard disk, and the like. The HDD 209 is a large-capacity storage device for storing the image data input from the scanner unit 201 and compressed by a compression/decompression unit 210.

The control unit 205 can cause the printer unit 203 to print the image data stored in the HDD 209, based on an instruction from the user. The HDD 209 is also used as a spooler, and the control unit 205 can manage the PDL code data received from the PC 102 as a print job and store the PDL code data in the HDD 209.

Besides, the control unit 205 can manage the print jobs stored in the HDD 209, and can also acquire the number of the stored print jobs and setting information performed on the print jobs.

The compression/decompression unit 210 performs compression/decompression operations of the image data and the like stored in the RAM 208 and the HDD 209 by various compression methods such as JBIG, JPEG and the like.

A sheet data management unit 211 manages control parameters used when printing the sheet for each sheet type and further for each brand of the sheet. The control parameter to be used when printing the sheet includes characteristics of the sheet itself (e.g., a basis weight, superficiality, and a direction of a gap of the sheet), a voltage adjustment value at the time of transfer, and an applied voltage value at the time of static elimination control.

Figure 2:
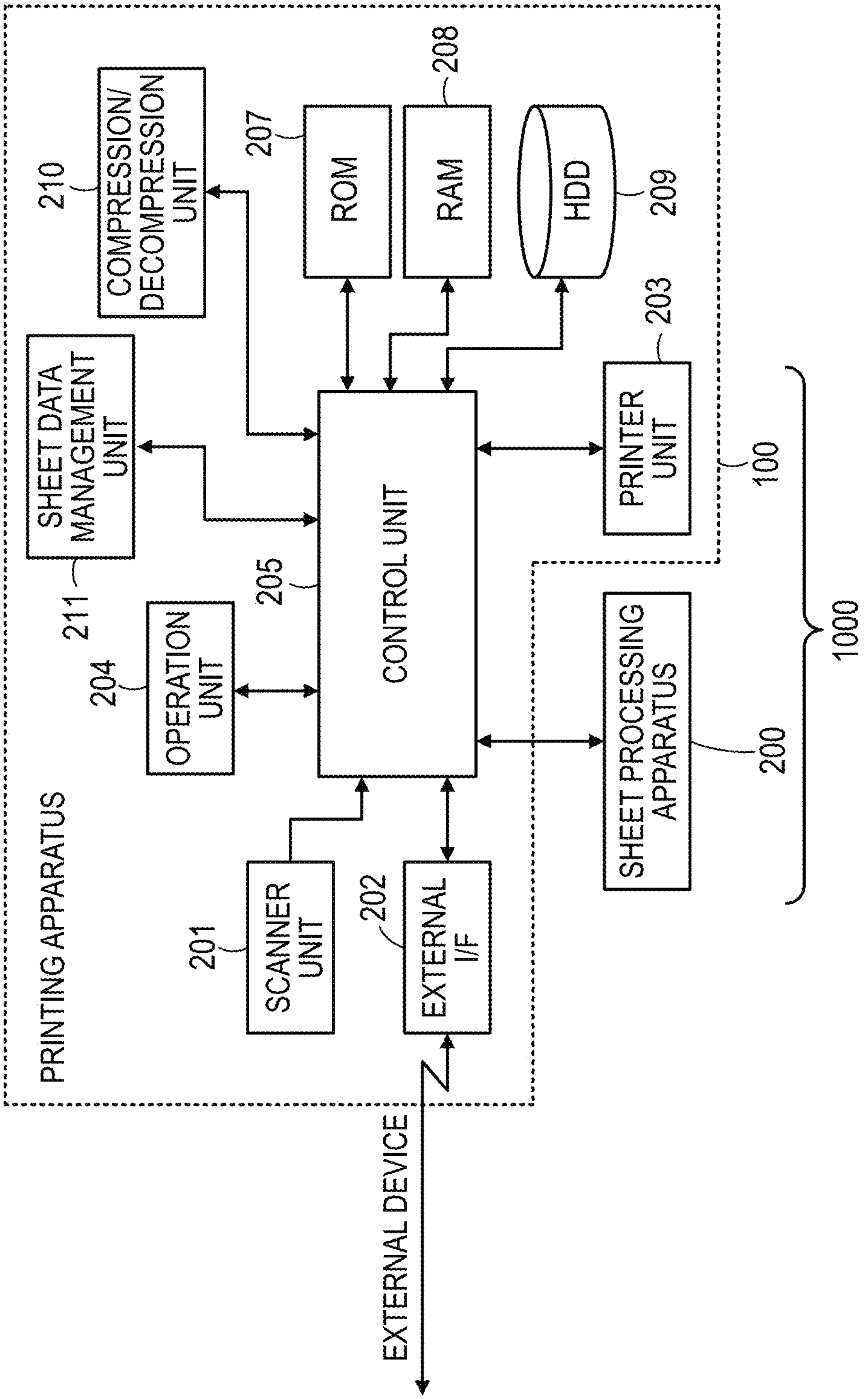
FIG. 2 is a block diagram of a printing system.

Although FIG. 2 illustrates one block, the substance of the sheet data management unit 211 is a database, and the database itself is stored in the HDD 209.

<Setting Screen of Applied Voltage>

Figure 6A:
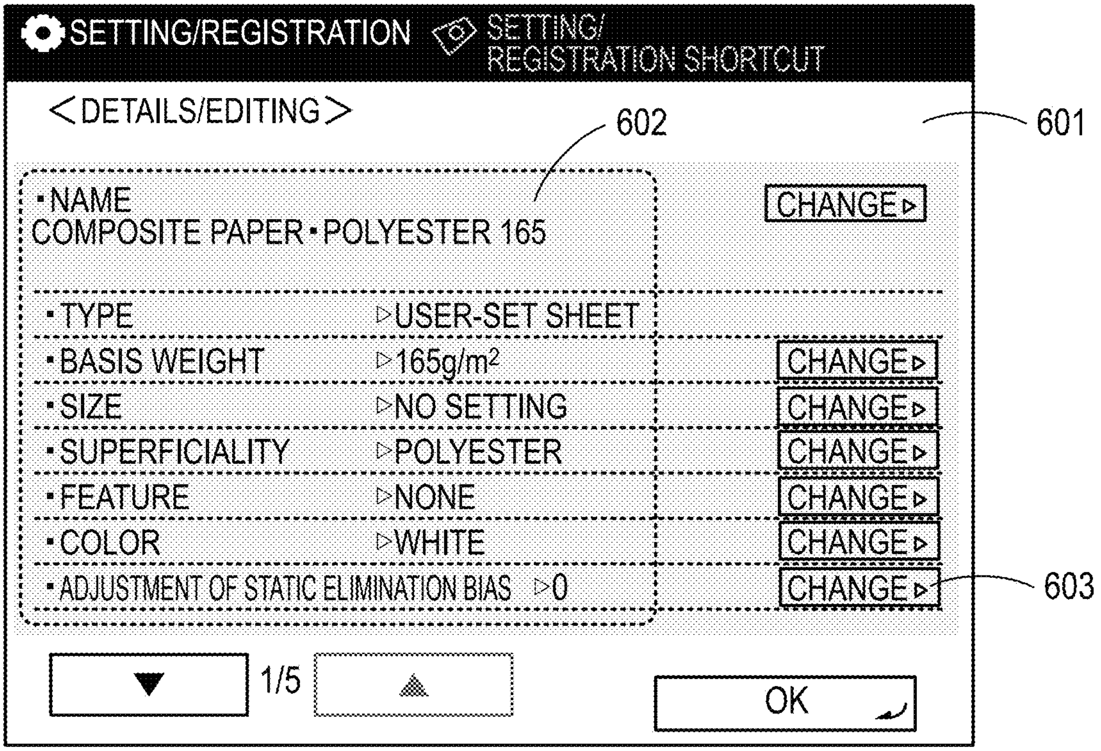
FIG. 6A illustrates a sheet data setting screen.
Figure 6B:
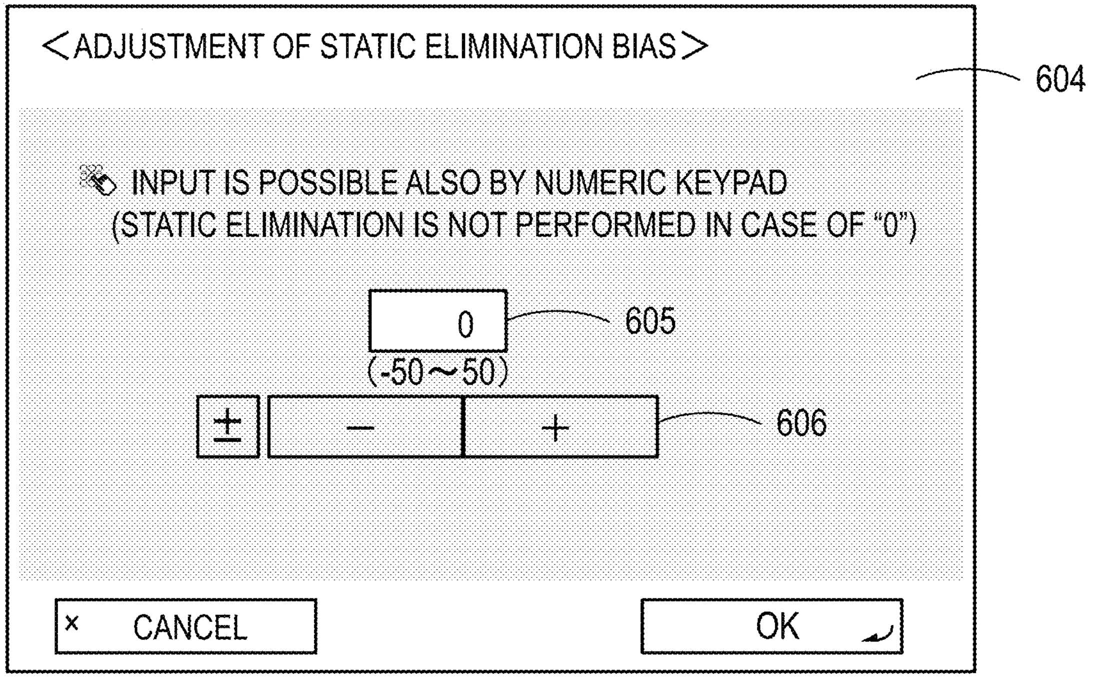
FIG. 6B illustrates a static elimination bias adjustment screen.

The sheet data management unit 211 has a setting screen for referring to and editing the contents of the database. The setting screen will be described hereinafter with reference to FIGS. 6A and 6B.

The printing system 1000 is configured to be capable of calling the setting screen for each sheet from the user via the operation unit 204. Upon receiving the call, the control unit 205 displays a sheet parameter list screen 601 of FIG. 6A on the touch panel unit 401 of the operation unit 204.

The sheet parameter list screen 601 includes a field 602 for displaying each parameter and its current setting value, and each parameter has a change button to be pressed when the setting value is changed.

Then, for example, consider a case where a "change" button 603 is pressed by the user to change the setting value of the adjustment of the applied voltage value (hereinafter, referred to as a "static elimination bias") for the static elimination. In this case, the control unit 205 displays a static elimination bias adjustment screen 604 of FIG. 6B on the touch panel unit 401 of the operation unit 204.

The static elimination bias adjustment screen 604 includes a field 605 for displaying a current setting and an input button 606 for inputting an increase or decrease of the setting value, and can set a static elimination bias voltage of the static elimination process performed by a static elimination apparatus 200-3*a* described later with respect to the sheet.

In the present embodiment, it is configured that the static elimination bias voltage of the static elimination process to be set here is not a direct voltage value [kV], but an intensity level having a sign of "+" or "−" is set in a range of "−50" to "50". As an actual operation here, for example, it is controlled that a voltage of 0.1 [kV] per "+1" is applied to the static elimination roller with respect to the setting value. Note that the unit of the setting value and the settable range described here are merely examples, and the present disclosure is not limited to this.

The control unit 205 can access the database via the sheet data management unit 211, and can acquire characteristic information of the sheets used for printing and parameter information used for printing control.

Hardware Configuration of Printing System

Figure 3:
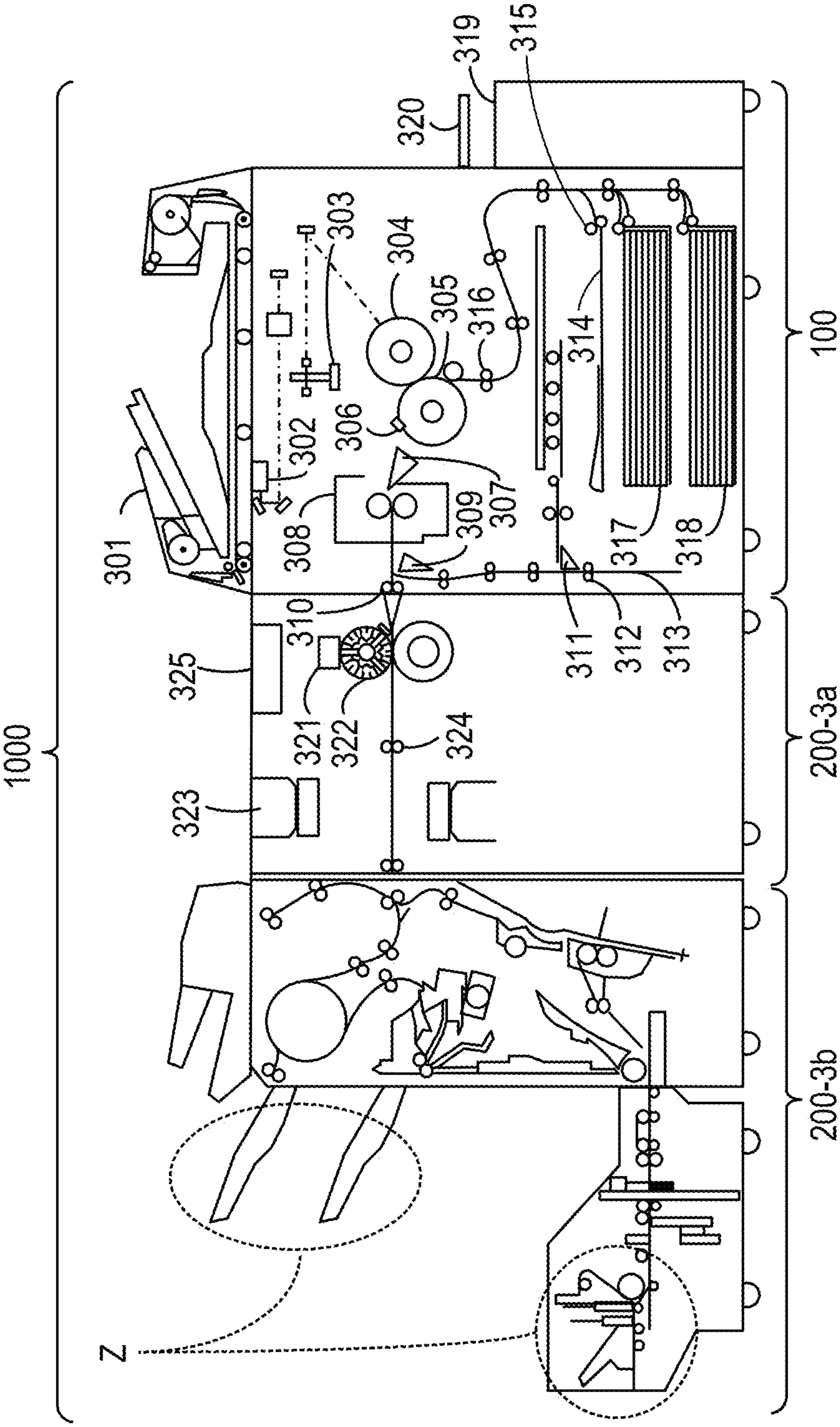
FIG. 3 is a cross-sectional configuration diagram of the printing system.

Next, a detailed hardware configuration of the printing system 1000 will be described with reference to FIG. 3. FIG. 3 is the cross-sectional configuration diagram of the printing apparatus 100 and the sheet processing apparatus 200 connected to the printing apparatus 100. In this diagram, the sheet processing apparatus 200 is configured to include the static elimination apparatus 200-3*a* and a saddle stitch binding apparatus 200-3*b*.

[Printing Apparatus]

First, the printing apparatus 100 will be described.

An ADF (automatic document feeder) 301 sequentially separates a document bundle set on a stacking surface of a document tray from a document of a first page in page order, and conveys the document onto a document platen glass for scanning it by a scanner 302.

The scanner 302 reads and scans an image of the document conveyed onto the document platen glass and converts the image into image data by a CCD.

A rotary polygon mirror (polygon mirror and the like) 303 receives a light beam such as a laser beam modulated according to the image data, and irradiates a photosensitive drum 304 with the light beam as reflection scanning light via a reflection mirror.

A latent image formed on the photosensitive drum 304 by the laser beam is developed by toners, and an acquired toner image is transferred onto a sheet material stuck on a transfer drum 305. A full-color image is formed by sequentially performing this series of image forming processes on yellow (Y), magenta (M), cyan (C), and black (K) toners.

After the four image forming processes, the sheet material on the transfer drum 305 on which the full-color image has been formed is separated by a separation claw 306, and is conveyed to a fixing device 308 by a pre-fixing conveyance device 307.

The fixing device 308 is configured by a combination of a roller and a belt, incorporates a heat source, such as a halogen heater, and thus melts and fixes the toner on the sheet material to which the toner image has been transferred by heat and pressure.

A sheet discharge flapper 309 is configured to be swingable about a swing shaft, and defines a conveyance direction of the sheet material. When the sheet discharge flapper 309 swings in the clockwise direction in the diagram, the sheet material is conveyed straight and discharged to the outside of the apparatus by a sheet discharge roller 310.

The control unit 205 controls the printing apparatus 100 to execute single-sided printing by a series of sequences as described above.

(Duplex Printing)

On the other hand, when the images are to be formed on both sides of the sheet material, the sheet discharge flapper 309 swings in the counterclockwise direction in the diagram, and the sheet material is conveyed to a duplex conveying unit with its path changed downward.

The duplex conveying unit includes a reversing flapper 311, a reversing roller 312, a reversing guide 313, and a duplex tray 314. The reversing flapper 311 swings about the swing shaft to define the conveying direction of the sheet material.

In the case of processing a duplex (double-sided) print job, the control unit 205 controls the reversing flapper 311 to swing in the counterclockwise direction in the diagram and feed the sheet printed on the first surface of the sheet by the printer unit 203 to the reversing guide 313 via the reversing roller 312.

Then, the reversing roller 312 is temporarily stopped in a state where the trailing edge of the sheet material is nipped by the reversing roller 312, and then the reversing flapper 311 is swung in the clockwise direction in the diagram. In addition, the reversing roller 312 is rotated in the reverse direction.

As a result, it is controlled that the sheet is switched back and conveyed, and the sheet is guided to the duplex tray 314 in a state where the rear end and the front end of the sheet have been switched.

The sheet material is temporarily stacked on the duplex tray 314, and thereafter, the sheet material is sent to a registration roller 316 again by a re-feed roller 315. At this time, the sheet material is fed so that the surface opposite to the first surface in the transfer step faces the photosensitive drum.

Then, an image of the second surface is formed on the second surface of the sheet in the same manner as the above-described process. Then, the images are formed on both sides of the sheet material, and the sheet is discharged from the inside of the main body of the printing apparatus 100 to the outside of the apparatus via the sheet discharge roller 310 through the fixing process.

The control unit 205 controls the printing apparatus 100 to execute the duplex printing by a series of sequences as described above.

Besides, the printing apparatus 100 includes a sheet feeding unit that stores sheets necessary for the printing process. The sheet feeding unit includes sheet feeding cassettes 317 and 318 (capable of storing 500 sheets, for example), a sheet feeding deck 319 (capable of storing 5000 sheets, for example), a manual feed tray 320, and the like.

The sheet feeding cassettes 317 and 318 and the sheet feeding deck 319 are capable of setting various sheets having different sizes and materials separately for each sheet feeding unit. Various sheets including a special sheet such as an OHP sheet or the like can be set on the manual feed tray 320.

[Static Elimination Apparatus]

Next, the static elimination apparatus 200-3*a* will be described. The static elimination apparatus 200-3*a* has a static elimination roller 322 and its pair of rollers, and the sheet conveyed to the static elimination apparatus 200-3*a* is conveyed while being nipped by both the rollers, and rough static elimination is performed by the static elimination roller 322.

Thereafter, while the sheet is conveyed to the outside of the apparatus by a conveyance roller 324, the static elimination process of the remaining electric charge is executed by an ionizer 323.

Besides, the static elimination apparatus 200-3*a* has an adjustment panel 325 for adjusting the setting value of the voltage to be applied in the static elimination process.

(Adjustment Panel of Voltage Setting Value)

Figure 8:
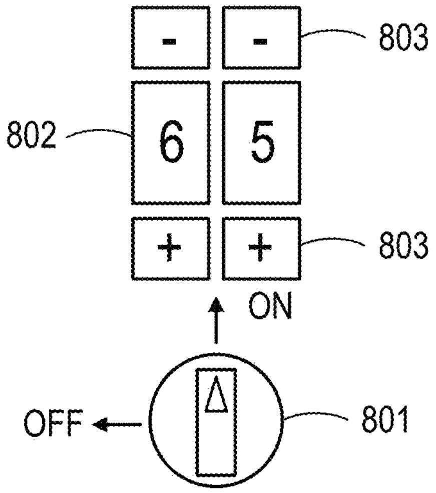
FIG. 8 is a diagram of an adjustment panel of the static elimination apparatus.

The adjustment panel 325 for adjusting the voltage setting value is illustrated in FIG. 8. The adjustment panel is configured by hardware, such as a dial switch 801, for turning on and off the power supply of the static elimination unit itself, a setting value display unit 802, and setting value adjustment buttons 803.

By increasing or decreasing the setting value of the setting value display unit 802 using the setting value adjustment buttons 803, it is possible to adjust the setting value of the voltage to be applied in the static elimination process. The adjustment panel 325 may display a UI as in FIG. 8 as a touch panel, and the user may operate the UI to adjust the voltage setting value.

The static elimination process in the static elimination apparatus 200-3*a* will be supplementarily described later with reference to FIG. 7.

Figure 5:
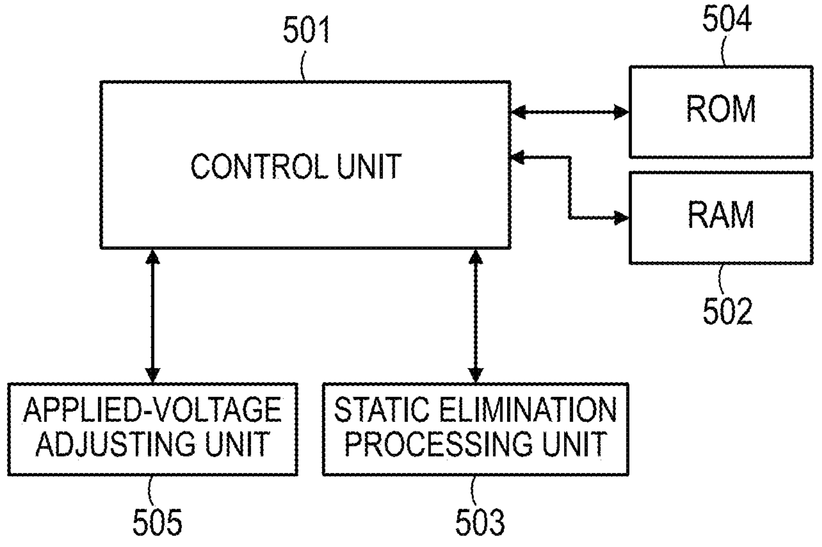
FIG. 5 is a block diagram of a static elimination apparatus.

FIG. 5 is a system block diagram of the static elimination apparatus 200-3*a*. The static elimination apparatus 200-3*a* also includes a control unit 501 separate from the printing apparatus 100.

The control unit 501 communicates with the control unit 205 of the printing apparatus 100 of FIG. 2 via a bus (not illustrated), and is configured to comprehensively manage the entire static elimination apparatus 200-3*a* while receiving information on the voltage setting to be applied in the static elimination process.

A static elimination processing unit 503 includes the static elimination roller 322 and the ionizer 323, and a voltage application controller 321 for applying a voltage to each of them, and is a portion that is responsible for the static elimination process on the conveyed sheet.

An applied-voltage adjusting unit 505 is configured by the adjustment panel 325 described above, and has a role of accepting the adjustment of the voltage setting value to be applied in the static elimination process from the user.

Then, the control unit 501 performs the static elimination control based on the setting value received by the applied-voltage adjusting unit 505 and the applied voltage setting value of the static elimination process received from the control unit 205 of the printing apparatus 100. Specifically, the control of applying the voltage to the static elimination roller 322 and the ionizer 323 is realized via the voltage application controller 321.

Note that the program of the static elimination process in the static elimination processing unit 503, the boot program of the static elimination apparatus 200-3*a*, and the like, which are executed by the control unit 501, are stored in a ROM 504. Then, the control unit 501 loads the necessary program from the ROM 504 to a RAM 502 as appropriate and executes the control.

(Static Elimination Process)

Here, the static elimination process to be performed by the static elimination processing unit 503 will be described additively with reference to FIG. 7.

Figure 7:
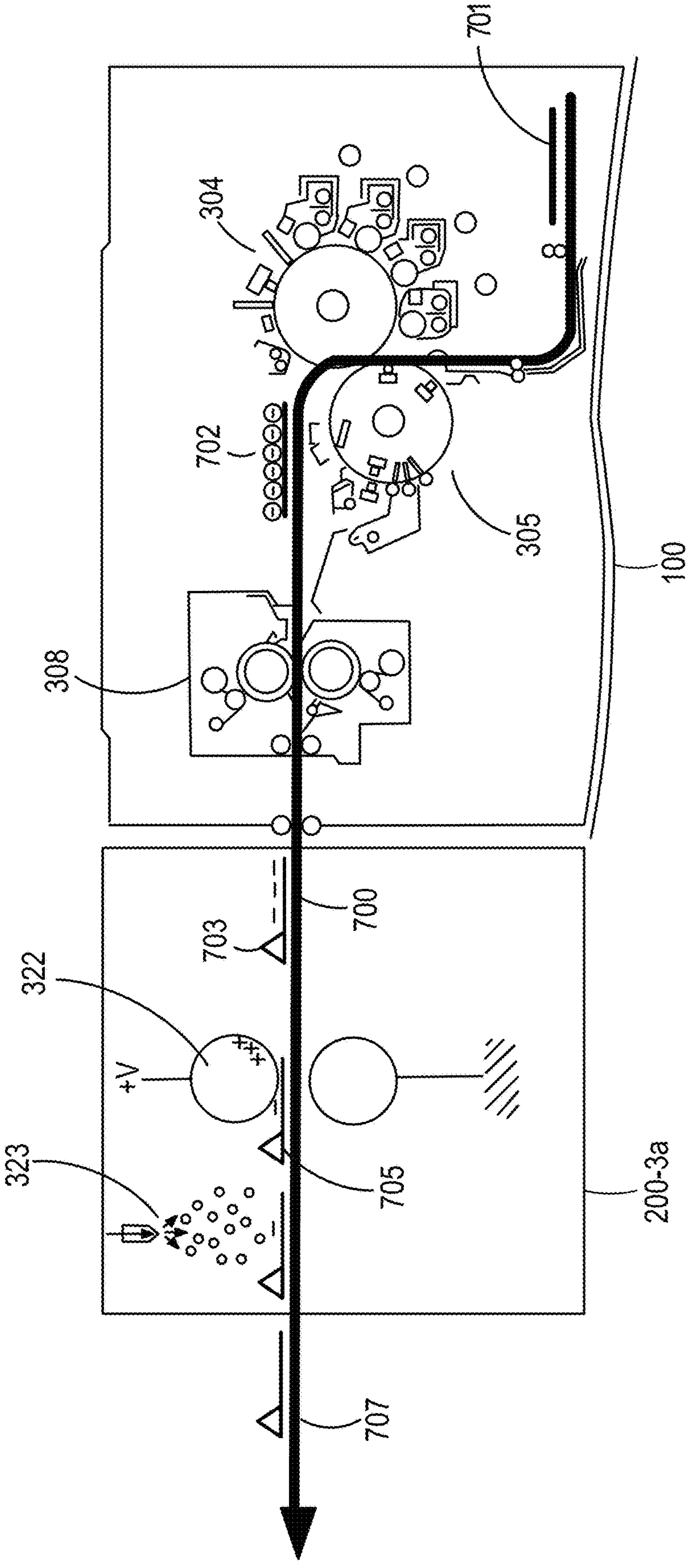
FIG. 7 is a diagram illustrating a static elimination process performed by the static elimination apparatus.

FIG. 7 is the diagram schematically illustrating a state in which the static elimination process is performed by the static elimination apparatus 200-3*a* on the sheet on which the printing process was performed by the printing apparatus 100. Note that the parts common to those in FIG. 3 are denoted by the same reference numerals, respectively.

First, a sheet 701 is conveyed to a development transfer unit including the photosensitive drum 304 and the transfer drum 305 via a conveyance path 700, and the toner is placed on the sheet 701.

A charged toner 702 placed on the sheet 701 is negatively charged, and the sheet 701 after being fixed through the fixing device 308 is conveyed to the static elimination apparatus 200-3*a* in a state where a print surface 703 side is negatively charged.

The static elimination apparatus 200-3*a* includes the positively charged static elimination roller 322, and applies a positive electric charge to the negatively charged print surface 703 by contact static elimination with the roller, thereby eliminating the charged state.

However, it is assumed that the negative electric charge that has not been completely removed by the static elimination process by the static elimination roller 322 or the positive electric charge that has been oppositely charged remains on a sheet 705 after passing through the static elimination roller.

Therefore, the static elimination apparatus 200-3*a* according to the present embodiment further includes the ionizer 323 downstream of the static elimination roller 322. The ionizer 323 is a device that generates corona discharge by applying a voltage to an electrode needle provided in its own device, and eliminates charging by using ions generated by the corona discharge.

As described above, a sheet 707 discharged from the static elimination apparatus 200-3*a* after the static elimination process is in a state in which the charging has been eliminated by performing the rough static elimination by the static elimination roller 322 and by further adjusting the remaining electric charge by the ionizer 323.

[Saddle Stitch Binding Apparatus]

Next, the saddle stitch binding apparatus 200-3*b* will be described. Examples of the sheet process by the saddle stitch binding apparatus 200-3*b* include saddle stitch binding, a punching process, a cutting process, a sheet discharging process, a folding process, and a stapling process. Here, these jobs are collectively referred to as a "saddle stitch binding job."

When the saddle stitch binding job is processed, the control unit 205 first conveys the sheets of the job printed by the printing apparatus 100 to the saddle stitch binding apparatus 200-3*b*, and then the control unit 205 causes the saddle stitch binding apparatus 200-3*b* to execute the sheet process of the saddle stitch binding job.

Then, the control unit 205 causes the printed material of the saddle stitch binding job subjected to the sheet process by the saddle stitch binding apparatus 200-3*b* to be held at a sheet discharge destination Z of the saddle stitch binding apparatus 200-3*b*.

The sheet discharge destination Z includes a plurality of sheet discharge destination candidates. This is used when the saddle stitch binding apparatus 200-3*b* is capable of executing a plurality of types of the sheet processes and determines the sheet discharge destination for each sheet process.

In the present embodiment, detailed description of the conveyance procedure of the saddle stitch binding job will be omitted.

(Printing Process)

Next, a process of performing printing while performing the static elimination process using an adjustment value of the static elimination bias, which is a setting value of the applied voltage for the static elimination process set for each sheet, and a voltage setting value of the applied voltage for the static elimination process set by the user on the adjustment panel 325 will be described.

Figure 9A:
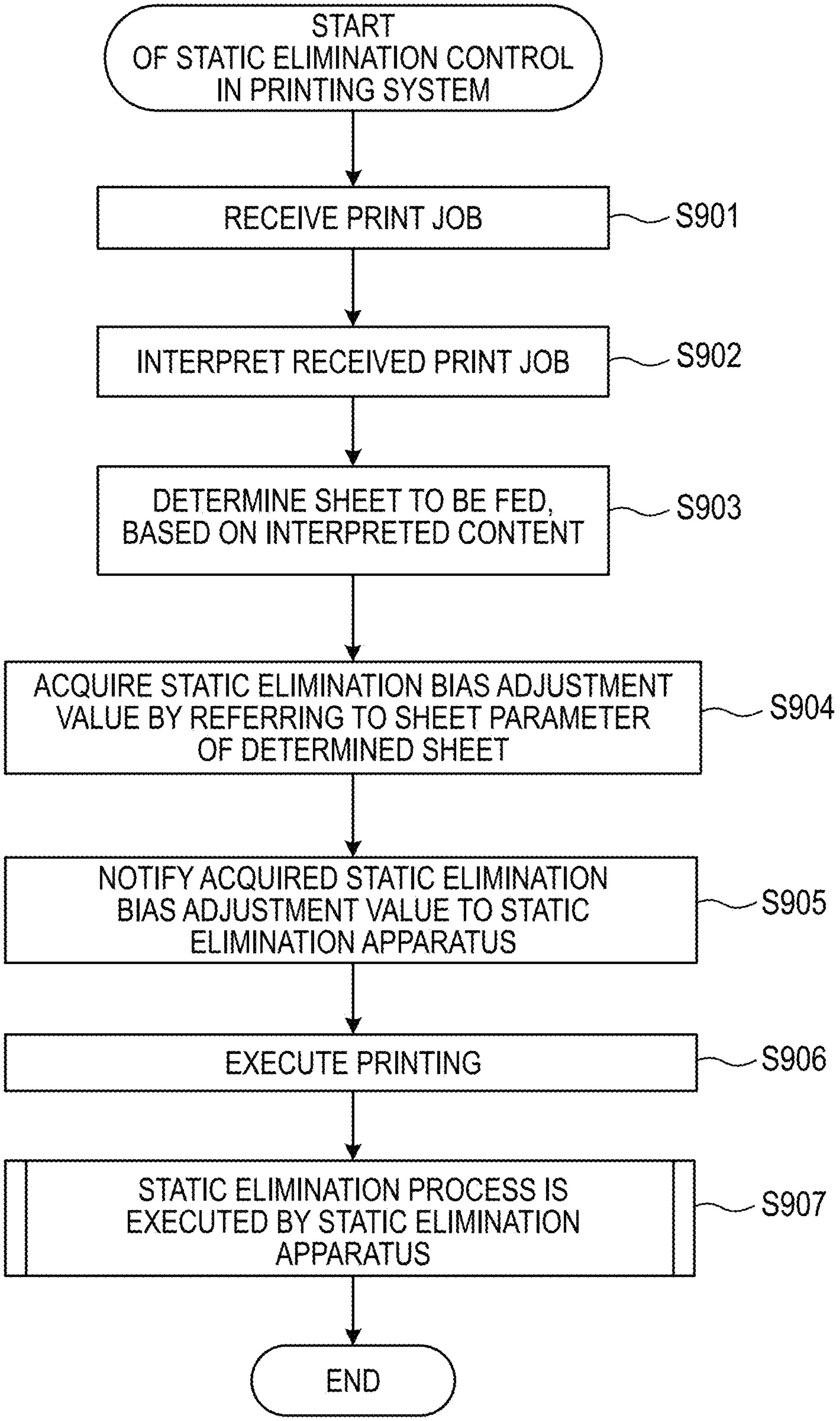
FIG. 9A is a flowchart of the static elimination process in a printing process of the printing system.

First, the overall process flow of the printing process including the static elimination process will be described with reference to a flowchart of FIG. 9A.

Note that S901 to S906 of this process are realized by the control unit 205 of the printing apparatus 100 loading the program stored in the ROM 207 on the RAM 208 and executing the loaded program.

Besides, S907 is realized by the control unit 205 instructing the static elimination apparatus 200-3*a* to perform the static elimination process and by the control unit 501 loading the program stored in the ROM 504 on the RAM 502 and executing the loaded program.

In S901, the control unit 205 of the printing apparatus 100 receives the print job via the network 101 and the external I/F 202.

In S902, the control unit 205 interprets the setting of the print job received in S901, and grasps designated contents such as the number of copies to be printed, the sheet discharge destination, and the post-process.

In S903, the control unit 205 reads PDL data for one page from the spooler on the HDD 209, expands the PDL data on the RAM 208, and determines the type of sheet to be used for printing the page.

In S904, the control unit 205 acquires, from the sheet data management unit 211, the setting value that is the adjustment value of the static elimination bias of the sheet data set in advance for the sheet determined in S903.

In S905, the control unit 205 notifies the setting value that is the adjustment value of the static elimination bias acquired in S904, to the control unit 501 of the static elimination apparatus 200-3*a*.

In S906, the control unit 205 executes printing of the page.

In S907, the control unit 501 that has received the notification of the setting value that is the adjustment value of the static elimination bias from the control unit 205 in S905 comprehensively controls the static elimination apparatus 200-3*a* so as to execute the static elimination process using the voltage value of the static elimination bias determined for the page printed in S906.

Here, the voltage value of the static elimination bias of the static elimination process is determined from the setting value that is the adjustment value of the static elimination bias for the page printed in S906 and the voltage setting value that is set by the user on the adjustment panel 325 of the static elimination apparatus 200-3*a*.

(Static Elimination Process)

Figure 9B:
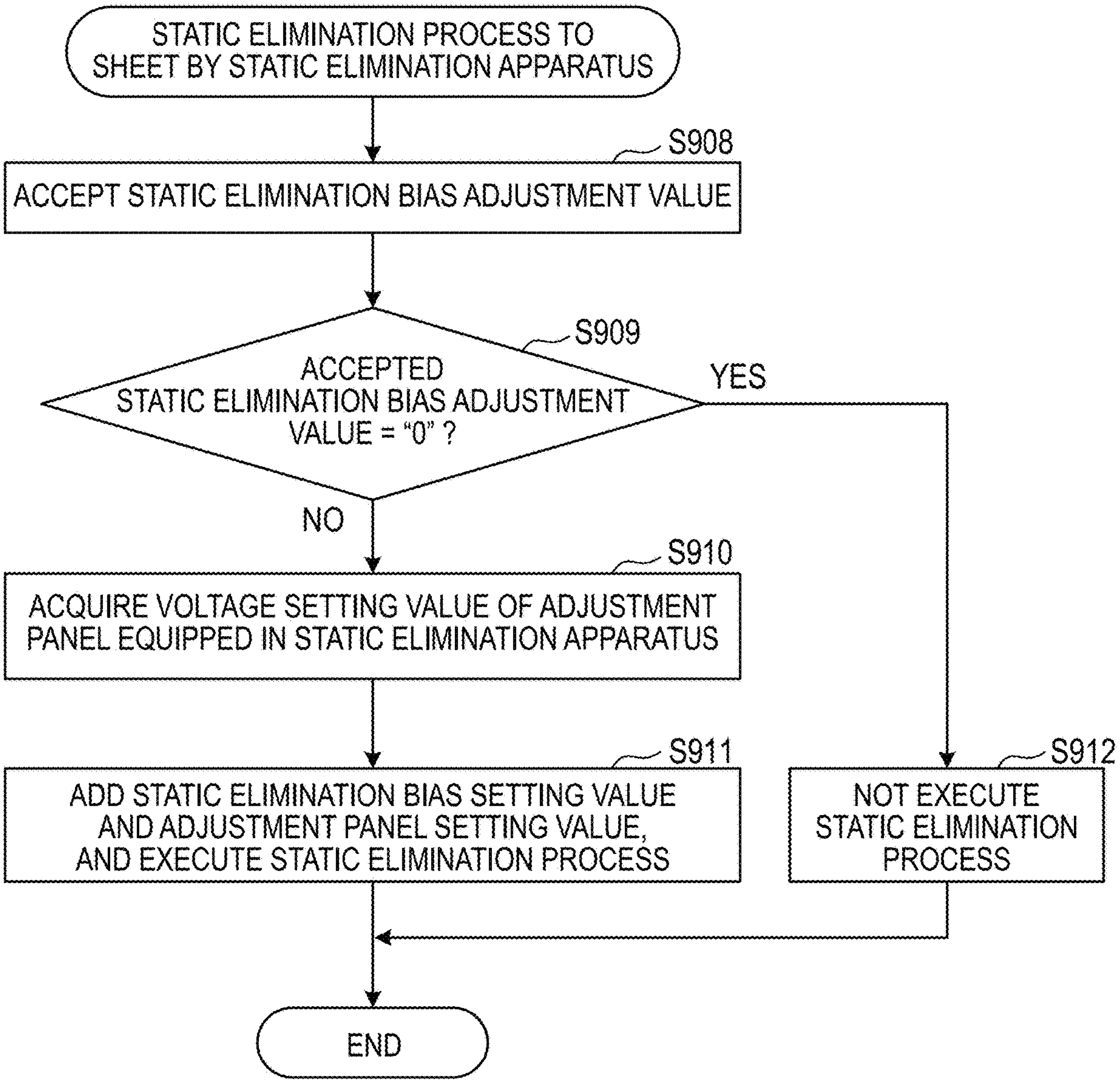
FIG. 9B is a flowchart of the static elimination process in the static elimination apparatus.

Next, the static elimination process for the sheet to be performed in S907 will be described with reference to FIG. 9B.

In S908, the control unit 501 of the static elimination apparatus 200-3*a* accepts the setting value that is the adjustment value of the static elimination bias notified from the control unit 205 in S905.

In S909, it is determined whether or not the accepted setting value that is the adjustment value of the static elimination bias is "0". Here, it is assumed that the fact that the setting value that is the adjustment value of the static elimination bias is "0" means the setting that the static elimination process is not performed.

When it is determined that the accepted setting value that is the adjustment value of the static elimination bias is not "0" (NO in S909), the process proceeds to S910.

In S910, the control unit 501 of the static elimination apparatus 200-3*a* acquires information on the voltage setting value set by the user on the adjustment panel 325 via the applied-voltage adjusting unit 505.

In S911, the control unit 501 of the static elimination apparatus 200-3*a* comprehensively controls the static elimination apparatus 200-3*a* to determine the voltage value of the static elimination bias based on the setting value being the adjustment value of the static elimination bias accepted in S908 and the voltage setting value acquired in S910 and to execute the static elimination process.

For example, in a case where the setting value that is the adjustment value of the static elimination bias accepted in S908 is X and the voltage setting value acquired in S910 is Y, the voltage value of the static elimination bias is determined by adding both the values in the form of X+Y, and it is controlled to execute the static elimination process.

Although the example in which the setting value that is the adjustment value of the static elimination bias set for each sheet and the voltage setting value that is set in the adjustment panel 325 of the static elimination apparatus 200-3*a* are added in a one-to-one relationship as the same unit has been described, the present disclosure is not limited thereto.

In addition, in order to make the above-described setting by the adjustment panel 325 more effective, it is also conceivable to multiply the voltage setting value Y acquired in S910 by a predetermined coefficient $\alpha$ of 1 or more and determine the voltage value to be used for the static elimination process by an expression of $X+\alpha Y$.

On the contrary, in order to make the setting value of the voltage by the adjustment panel 325 less effective, it may be possible to determine the voltage value by using a predetermined coefficient $\beta$ of 1 or less by an expression of $X+\beta Y$.

Further, conversion is not limited to the linear conversion of X and Y, and the conversion may be performed by an arbitrary function of the variables X and Y.

On the other hand, when it is determined that the accepted adjustment value of the static elimination bias is "0" (YES in S909), the process proceeds to S912.

In S912, the control unit 501 of the static elimination apparatus 200-3*a* comprehensively controls the static elimination apparatus 200-3*a* so as not to execute the static elimination process.

In the present embodiment, the example has been described in which the control is performed by determining that the adjustment value of the static elimination bias accepted in S908 is "0" as the intention of not performing the static elimination process, but a configuration may be employed in which a setting for clearly indicating that the static elimination process is not performed is provided and used for the control.

By performing the above-described control, it is possible to perform the static elimination process while adding the value set by the hard dial switch to the applied voltage value that has been adjusted in advance, and it is thus possible to expect an improvement in operability and an improvement in productivity accompanying the operability improvement.

According to the printing system of the present disclosure, the voltage value of the static elimination bias held in the sheet data of the sheet used for the printing can be easily fine-adjusted by the static elimination apparatus.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2024-209877, which was filed on Dec. 3, 2024 and which is hereby incorporated by reference herein in its entirety.

What is claimed is:

1. A printing system comprising:

a printing apparatus configured to store sheet data, wherein the sheet data include a respective first setting value for each sheet type; and a static elimination apparatus configured to perform a static elimination process for a sheet received from the printing apparatus, wherein the sheet received from the printing apparatus has been subjected to printing by the printing apparatus, wherein the static elimination apparatus comprises a control unit configured to control the static elimination process by using a voltage value of a static elimination bias determined based on the respective first setting value for the sheet type of the sheet received from the printing apparatus and a second setting value set by the static elimination apparatus.

2. The printing system according to claim 1, wherein the second setting value is a voltage setting value of the static elimination bias set by a user in the static elimination apparatus.

3. The printing system according to claim 2, wherein the second setting value is capable of being set by hardware of the static elimination apparatus.

4. The printing system according to claim 1, wherein the first setting value is an adjustment value of the static elimination bias adjusted for the sheet received from the printing apparatus in the sheet data.

5. The printing system according to claim 1, wherein the voltage value of the static elimination bias is determined by adding the first setting value and the second setting value.

6. The printing system according to claim 1, wherein the control unit controls not to perform the static elimination process, in a case where a setting for not performing the static elimination process for the sheet received from the printing apparatus is included in the sheet data.

7. The printing system according to claim 6, wherein, in the setting for not performing the static elimination process for the sheet received from the printing apparatus, the first setting value is "0".

8. The printing system according to claim 1, wherein the voltage value of the static elimination bias is determined by adding the first setting value and a value obtained by multiplying the second setting value by a predetermined coefficient.

9. A control method of a printing system that comprises a printing apparatus configured to store sheet data, wherein the sheet data include a respective first setting value for each sheet type, and a static elimination apparatus configured to perform a static elimination process for a sheet received from the printing apparatus, wherein the sheet received from the printing apparatus has been subjected to printing by the printing apparatus, the control method comprising:

controlling, in the static elimination apparatus, the static elimination process by using a voltage value of a static elimination bias determined based on the respective first setting value for the sheet type of the sheet received from the printing apparatus and a second setting value set by the static elimination apparatus.

10. A non-transitory computer-readable storage medium that stores a program for causing a computer to execute a control method of a printing system that comprises a printing apparatus configured to store sheet data, wherein the sheet data include a respective first setting value for each sheet type, and a static elimination apparatus configured to perform a static elimination process for a sheet received from the printing apparatus, wherein the sheet received from the printing apparatus has been subjected to printing by the printing apparatus, the control method comprising:

controlling, in the static elimination apparatus, the static elimination process by using a voltage value of a static elimination bias determined based on the respective first setting value for the sheet type of the sheet received from the printing apparatus and a second setting value set by the static elimination apparatus.

* * * * *